J. K. BOLAND.
GEAR SHIFTING MECHANISM.
APPLICATION FILED DEC. 4, 1911.
1,028,532.
Patented June 4, 1912.
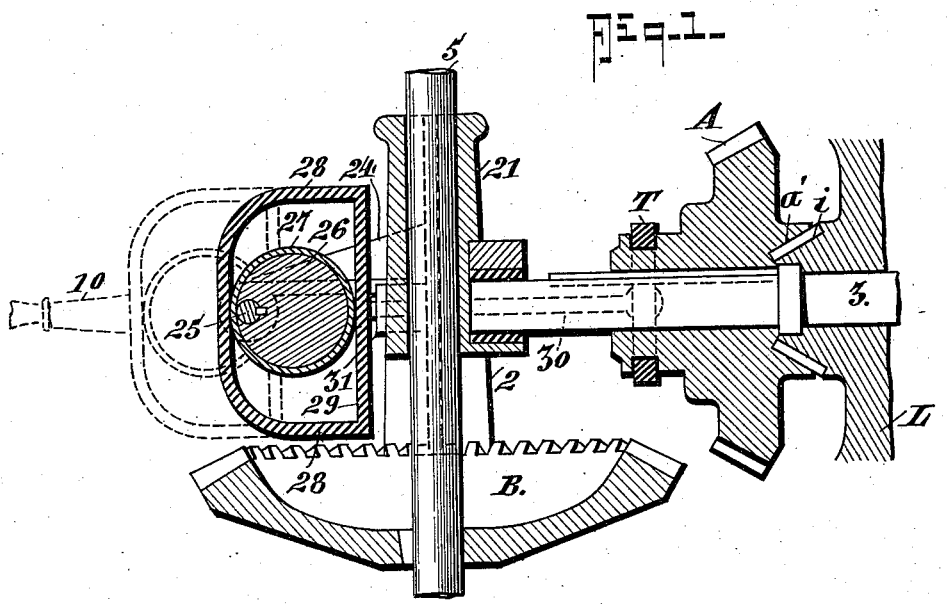
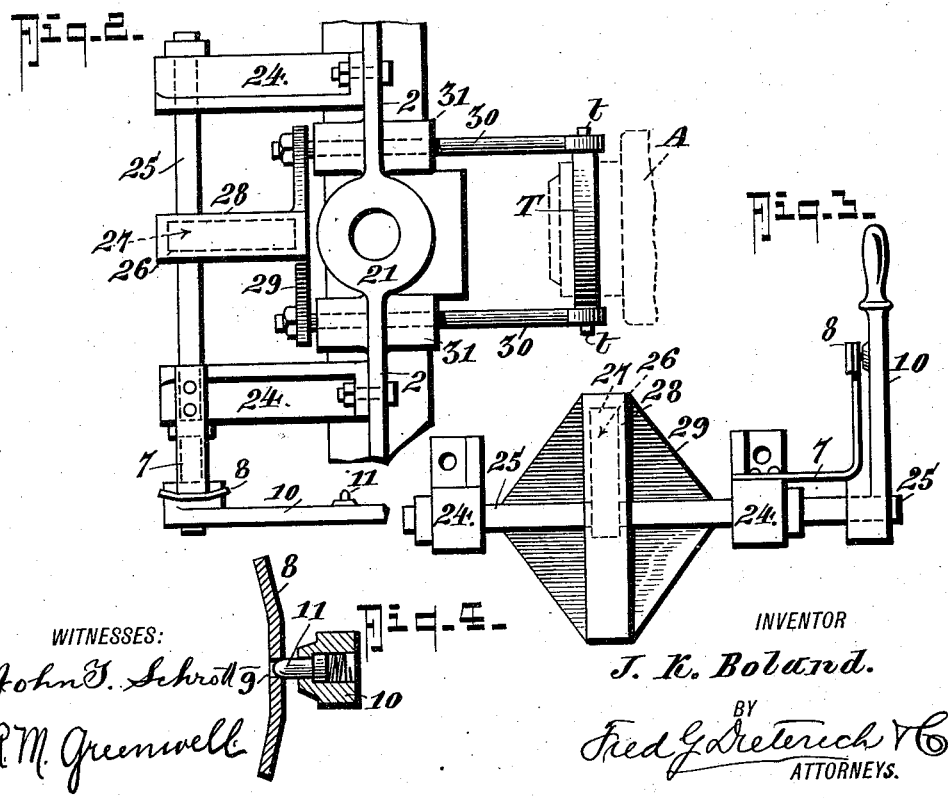
WITNESSES:
John T. Schrott
R. M. Greenwell
INVENTOR
J. K. Boland.
BY
Fred G. Dieterich & Co
ATTORNEYS.
COLUMBIA PLANOGRAPH CO., WASHINGTON, D. C.

UNITED STATES PATENT OFFICE.

JOSEPH K. BOLAND, OF NEW ORLEANS, LOUISIANA.

GEAR-SHIFTING MECHANISM.

1,028,532.  Specification of Letters Patent.  Patented June 4, 1912.

Application filed December 4, 1911. Serial No. 663,729.

*To all whom it may concern:*

Be it known that I, JOSEPH K. BOLAND, residing in New Orleans, in the parish of Orleans and State of Louisiana, have invented certain new and useful Improvements in Gear-Shifting Mechanism, of which the following is a specification.

My invention is an improved mechanism for shifting the shiftable clutch gear of a power transmitting mechanism, such for example as is disclosed in my Patent No. 996965 of July 4, 1911, and the present invention is designed to take place of the mechanism therein shown for shifting the clutch gear A from engagement with the clutch face of the intermediate gear L and into engagement with the gear B and vice versa.

Generally, the present invention resides in providing a cam actuated shifting rod device connected with the shiftable gear whereby greater power can be applied to shift the gear than is possible with the mechanism shown in my patent hereinbefore referred to.

More specifically the invention includes those novel details of construction, combination and arrangement of parts, all of which will be first fully described and then be specifically pointed out in the appended claims, reference being had to the accompanying drawing, in which:

Figure 1 is a central vertical longitudinal section of a portion of a horse power such as is shown in my patent hereinbefore referred to, and embodying the present invention. Fig. 2 is a top plan view of the parts constituting the present invention. Fig. 3 is a front elevation of a portion of the mechanism. Fig. 4 is an enlarged detail section of a part of the device.

In the drawings in which like numerals and letters of reference indicate like parts in all the figures, 5 is the first or driving shaft, which is mounted in a bearing 21 in the frame 2 of the machine. The second or driven shaft 3 carries the shiftable clutch gear A, which is splined to the shaft to turn it, and the shaft 3 also carries the speed changing gear L which runs loose on the shaft 3. The gear L is driven from the shaft 5 through suitable gearing, not shown in the accompanying drawing, such, for example, as that disclosed in my patent hereinbefore referred to. The gear L has a clutch face $i$, and the clutch gear A has a clutch face $a'$ to coöperate therewith.

B is the driving shaft gear that coöperates with the gear part of the clutch gear A.

T represents the ring or strap that has trunnions $t$ to which the shifting mechanism hereinafter described, connects.

All of the foregoing described parts may be of the same construction as the corresponding parts of the mechanism shown in my patent aforesaid.

The frame 2 has a pair of bearings 31 for the shifting rods 30, that are connected at one end to the trunnions "$t$" and at the other end, they are secured to the base 29 of a cam strap or guide 28, in which the operating cam 26 is located. The cam 26 is mounted on a shaft 25 and has a wearing surface 27. The shaft 25 turns in bearings in brackets 24 that project from the frame web 2. Motion is imparted to the shaft 25 by a lever 10, which is held in the neutral position by a pin 11, that enters a hole 9, in the guide 8 of the holder 7, that is fastened to one of the brackets 24, as best indicated in Figs. 3 and 4 of the drawings.

In operation, when the parts are in the full line position shown in Fig. 1, the clutch gear A will be engaged with the clutch face of the gear L, and in order to move the clutch gear A out of connection with the gear B, it is only necessary to swing the lever 10 over to the dotted line position shown in Fig. 1. When the lever 10 is in the vertical or mid position, the pin 11 will rest in the hole 9 and the lever 10 will thus hold the clutch gear A out of connection with both gears B and L, and the shaft 3 will be at rest.

From the foregoing description taken in connection with the accompanying drawing, it is thought the complete construction, operation, and advantages will be apparent to those skilled in the art.

What I claim is:—

1. In a gear shifting mechanism, a support, a rock shaft supported thereon, a cam on said rock shaft, a yoke in which said cam operates, connecting rods extending from said yoke, and means by which said rock shaft may be rocked.

2. In a gear shifting mechanism, a support, a rock shaft, a cam on said rock shaft, a yoke in which said cam operates, a pair of connecting rods extending from said yoke, bearings for said connecting rods, a lever for rocking said rock shaft, bearings for supporting said rock shaft from said support and a collar having trunnions to which the ends of said rods are connected.

3. In a gear shifting mechanism, a support, a rock shaft, a cam on said rock shaft, a yoke in which said cam operates, connecting rods extending from said yoke, bearings for said connecting rods, a lever for rocking said rock shaft, bearings for supporting said rock shaft from said support, and means for holding said lever in the neutral position.

4. In a gear shifting mechanism, a support, a rock shaft, a cam on said rock shaft, a yoke in which said cam operates, connecting rods extending from said yoke, bearings for said connecting rods, a collar pivotally mounted between the ends of said connecting rods, a lever for rocking said shaft, bearings for supporting said rock shaft from said support, a resilient arm having an aperture, and a spring latch on said lever coöperating with said arm aperture for holding said lever in the neutral position.

JOSEPH K. BOLAND.

Witnesses:
A. H. RITTER,
A. S. CARBARO.

Copies of this patent may be obtained for five cents each, by addressing the "Commissioner of Patents, Washington, D. C."